(12) United States Patent
Fujieda et al.

(10) Patent No.: US 8,100,679 B2
(45) Date of Patent: Jan. 24, 2012

(54) CENTER MECHANISM OF TIRE VULCANIZER AND CONTROL METHOD FOR THE SAME

(75) Inventors: Yasuhiko Fujieda, Takasago (JP); Tomomichi Murata, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 595 days.

(21) Appl. No.: 12/253,683

(22) Filed: Oct. 17, 2008

(65) Prior Publication Data

US 2009/0139659 A1    Jun. 4, 2009

(30) Foreign Application Priority Data

Nov. 30, 2007  (JP) ................. 2007-310181

(51) Int. Cl.
*B29C 35/02* (2006.01)

(52) U.S. Cl. ............... 425/43; 425/48; 425/214

(58) Field of Classification Search ............ 425/29, 425/43, 48, 58, 214
See application file for complete search history.

(56) References Cited

U.S. PATENT DOCUMENTS

| | | | | | |
|---|---|---|---|---|---|
| 3,487,507 | A | * | 1/1970 | Turk | 425/29 |
| 3,794,457 | A | * | 2/1974 | Gazuit | 425/58 |
| 4,368,015 | A | * | 1/1983 | Kawahara et al. | 425/29 |
| 5,776,507 | A |   | 7/1998 | Ureshino et al. | |

FOREIGN PATENT DOCUMENTS

| | | |
|---|---|---|
| JP | 62-6964 | 2/1987 |
| KR | 2001-77239 | 8/2001 |

* cited by examiner

*Primary Examiner* — James Mackey
(74) *Attorney, Agent, or Firm* — Oblon, Spivak, McClelland, Maier & Neustadt, L.L.P.

(57) ABSTRACT

A center mechanism of a tire vulcanizer is provided with a screwing mechanism provided with a screw shaft and a screw nut screwed onto the screw shaft, a motor for rotating the screw shaft so as to raise and lower an upper ring body, an inverter for controlling the motor, and a mechanical brake for retaining a predetermined position of the upper ring body so that a bladder retains a shaping state. Within a time range from start of a closing action of the upper die to contact between the upper die and the upper ring body, an operation of the mechanical brake is released and position control of the upper ring body by the inverter is started, and at least after the release of the operation of the mechanical brake, a position of the upper ring body is controlled by the inverter. By such a configuration, even when there is an erroneous operation of the brake or incorrect setting, it is possible to prevent damage and breakage of constituent parts and have a simple structure.

8 Claims, 5 Drawing Sheets

CENTER MECHANISM OF TIRE VULCANIZER AND CONTROL METHOD FOR THE SAME

BACKGROUND OF THE INVENTION

1. Field of the Invention

The present invention relates to a center mechanism of a tire vulcanizer for attaching and detaching a bladder for vulcanization-molding to and from a green tire. More specifically, the present invention relates to a center mechanism of a motor driven tire vulcanizer in which a bladder is raised and lowered in the vertical direction so as to attach and detach the bladder.

2. Description of the Related Art

A tire vulcanizer is a machine for heating an unvulcanized tire which is called as a green tire housed in a die from the inside and the outside of the die so as to perform vulcanization-molding, and in general, a extendable and contractible rubber bag formed by a material having elasticity (such as butyl rubber) called as a bladder is attached in the center thereof. This bladder is inserted so as to be along an inner surface of the green tire which is brought in the center of the die of the vulcanizer. A heating and pressurizing medium with a high temperature and high pressure such as steam is supplied to the inside thereof so as to vulcanize the green tire. The green tire vulcanized by heating and pressurizing for a fixed time is to be a vulcanized tire, the bladder is removed and the tire is brought to the next step. Such a bladder type vulcanizer is provided with a device for attaching and detaching the bladder to and from the green tire and the device is called as a center mechanism of the vulcanizer. In this center mechanism, various types of mechanisms are commercialized. The present invention relates to a center mechanism of a tire vulcanizer in which an upper edge part of a bladder is raised and lowered in the vertical direction so as to attach and detach the bladder. As the center mechanism of this type, there are techniques disclosed in the following related documents.

Conventionally, a technique related to a center mechanism for a fluid pressure driven tire vulcanizer is disclosed (for example, refer to U.S. Pat. No. 5,776,507). This center mechanism for the tire vulcanizer is provided with a center post to which an upper clamp ring for retaining an upper edge part of a bladder is attached to an upper end thereof, a first cylinder attached to a lower end of the center post, and a second cylinder arranged in parallel to the first cylinder. The upper clamp ring is raised and lowered by the first cylinder through the center post. The entire bladder is raised and lowered by the second cylinder. This patent document is applied for patent by the present applicant. Although not described in the published document, since there is a need for large force to operate the first cylinder and the second cylinder, a hydraulic cylinder with high pressure is generally used as the first cylinder and the second cylinder.

Here, the first cylinder is attached in series with the center post so as to extend from the lower end of the center post to the lower side. Therefore, the entire length of the vulcanizer is extended and installation height of a die part is suppressed. Consequently, there is frequently a need for forming a pit having predetermined depth in an installation surface of the vulcanizer and installing the vulcanizer at the place. In the center mechanism described in this patent document, the second cylinder is arranged in parallel to the first cylinder. Therefore, the entire length is suppressed in comparison to a center mechanism in which a second cylinder is arranged in series with a first cylinder. However, a countermeasure thereof is not yet sufficient as there is a need for a shallow pit.

In order to form the pit, a fundamental work is increased. When the pit is formed, a degree of freedom in changing arrangement of the vulcanizer is decreased.

Since the first cylinder is positioned at a lower part of the center of the vulcanizer, an exchange of the first cylinder is not easily performed in the case of occurrence of oil leakage in the cylinder or the like. There is also a problem that the heating and pressurizing medium with a high temperature and high pressure to be supplied into the bladder and the first cylinder come close to each other so that the life of oil is shortened. Further, since hydraulic pressure is used as a drive source, there is also a problem that a sealing structure thereof is complicated.

As a technique without such problems, the present applicant also proposes a technique related to a center mechanism for a motor driven tire vulcanizer in which fluid pressure driving is replaced by motor driving (for example, refer to Japanese Patent Laid-Open No. Sho 62-6964). This center mechanism of the vulcanizer is provided with a rod (a center post) to which an upper ring body retaining an upper edge part of a bladder is attached to an upper end thereof, a cylinder tube in which a rotational movement body which is formed by a screwing shaft and a screw nut for a ball screw screwed onto the screwing shaft is installed, a motor for rotating the screwing shaft, and a fluid impact absorbing device provided at a lower end of the cylinder tube. By rotating the screwing shaft by the motor, rotational movement of the motor is converted into up and down movement of the screw nut, and the rod is raised and lowered together with the screw nut. At the time of lowering the rod, the screwing shaft is housed in the rod. Therefore, in comparison to the center mechanism for the fluid pressure driven tire vulcanizer described in U.S. Pat. No. 5,776,507, the center mechanism for the tire vulcanizer described in this patent document is capable of suppressing the entire length thereof. Due to the motor driving, there is no problem in the oil leakage, the decrease in the life of the oil, and the complicated sealing structure as in the case of the fluid pressure driving.

However, in the center mechanism for the motor driven tire vulcanizer described in Japanese Patent Laid-Open No. Sho 62-6964, there are the following problems as a driving method is replaced from the fluid pressure driving to the motor driving. In order to explain the problems, at first, a part of operations of the center mechanism for the tire vulcanizer described in this patent document will be briefly described. At the time of performing shaping of a green tire, the upper ring body which is already raised is firstly lowered and stopped at a predetermined position and a brake is put on. This is to avoid a situation that the screwing shaft is rotated by shaping pressure imposed on the bladder so that the upper ring body is raised and a position of the bladder is displaced, and hence the air is mixed into between the bladder contacted onto an inner surface of the green tire with pressure and the inner surface of the green tire. Next, when the shaping is finished, an upper die performs a closing action so as to perform die clamping. Since the shaping pressure is imposed on the bladder even during the closing action of this upper die, there is a need for putting on the brake even during the closing action of the upper die in order to prevent a rise of the upper ring body until the upper die and the upper ring body are brought into contact with each other. The brake is released immediately before the upper die and the upper ring body are brought into contact with each other. Then, the upper ring body is lowered to a press position while being pushed down by the upper die. Here, during the closing action of the upper die, in order to suppress impact force generated at the time of the contact between the upper die and the upper ring body and suppress movement (the rise) of the upper ring body due to the shaping pressure, the brake should be released immediately before (at the very last moment before) the contact between the upper die and the upper ring body. However, setting of the release timing is difficult. Therefore, the center mechanism for the tire vulcanizer described in this patent document is provided with the fluid impact absorbing device serving as a device for absorbing downward impact force in the vertical direction due to the contact between the upper die and the upper ring body.

The problems in the center mechanism for the tire vulcanizer described in Japanese Patent Laid-Open No. Sho 62-6964 firstly include a point that in this center mechanism, a structure is complicated by providing the fluid impact absorbing device. Other problem is that even when the fluid impact absorbing device capable of absorbing the downward impact force in the vertical direction is provided, the brake is a mechanical brake. Therefore, in the case where the brake is not disengaged (or released) at the good timing due to an erroneous operation of this brake or incorrect setting, and even when the screwing shaft is to be rotated through the screw nut by lowering force of the upper die after the contact between the upper die and the upper ring body, the screwing shaft cannot be rotated due to brake force. Consequently, there is sometimes a case where a large overload is continuously imposed on the screwing shaft, the screw nut, the brake and the like so that a screwing part is damaged and the brake is broken.

SUMMARY OF THE INVENTION

The present invention is achieved in consideration to the above situation. It is an object of the present invention to provide a center mechanism of a motor driven tire vulcanizer capable of preventing damage and breakage of constituent parts even with an erroneous operation of a brake or incorrect setting and having a simple structure, and a control method thereof.

In a basic configuration of a center mechanism of a tire vulcanizer according to the present invention in order to achieve the above object, the center mechanism of the tire vulcanizer having an upper die, a bladder, and an upper ring body for retaining an upper edge part of the bladder comprises a screw shaft arranged in the vertical direction, a screwing mechanism provided with a screw nut screwed onto the screw shaft, a motor for rotating the screw shaft so as to raise and lower the upper ring body, and motor control means for controlling a position of the upper ring body through the motor, wherein position control of the upper ring body by the motor control means is started before the upper die and the upper ring body are brought into contact with each other and functions at the instance when the upper die and the upper ring body are brought into contact with each other.

According to this configuration, when a fixed load or more is imposed on the motor at the time of the contact between the upper ring body and the upper die, the motor is allowed to rotate. As a result, a fixed overload or more is not imposed on the constituent parts of the center mechanism such as the screw shaft. Therefore, it is possible to prevent the damage and the breakage of the constituent parts of the center mechanism provided in the tire vulcanizer. Since generation of a fixed overload or more can be prevented as described above, there is no need for providing a fluid impact absorbing device as described in Japanese Patent Laid-Open No. Sho 62-6964. Therefore, it is possible for the center mechanism of the vulcanizer to have a simple structure.

In the above basic configuration of the center mechanism of the tire vulcanizer, the center mechanism may further comprise a mechanical brake operated in a state that the upper die of the tire vulcanizer is opened for retaining a predetermined position of the upper ring body so that the bladder retains a shaping state, wherein within a time range from start of a closing action of the upper die to the contact between the upper die and the upper ring body, an operation of the mechanical brake may be released and the position control of the upper ring body by the motor control means may be started, and at least after the release of the operation of the mechanical brake, the position of the upper ring body may be controlled by the motor control means.

According to this configuration, after shaping state, within the time range from the start of the closing action of the upper die to the contact between the upper die and the upper ring body, the upper ring body retaining the upper edge part of the bladder is switched from a control state by the mechanical brake to a control state by the motor control means. Here, according to stop control (braking) of the motor by the motor control means without using the mechanical brake after switching the control state, even when the upper ring body and the upper die are collided with each other in a braked state due to the incorrect setting of a brake release position or the like, the motor is allowed to rotate with a fixed load or more imposed on the motor. As a result, a fixed overload or more is not imposed on the constituent parts of the center mechanism such as the screw shaft.

In the center mechanism of the tire vulcanizer in which the above mechanical brake is used, the motor control means may be an inverter provided by a DC braking function, the motor may be an inverter motor, and at least after the release of the operation of the mechanical brake, the inverter may control the inverter motor by the DC braking function of the inverter so that the position of the upper ring body is controlled so as not to move to the upper side.

According to this configuration, after switching to the position control of the upper ring body by the inverter, the position of the upper ring body is controlled by the DC braking function provided in the inverter. That is, the position of the upper ring body is controlled by not the mechanical brake but the DC braking function provided in the inverter. Therefore, even when there is the incorrect setting of the brake, a fixed overload or more is not imposed on the constituent parts of the center mechanism such as the screw shaft. Consequently, it is possible to prevent the damage and the breakage of the constituent parts of the center mechanism provided in the tire vulcanizer.

In the center mechanism of the tire vulcanizer in which the inverter provided with the above DC braking function is used, an orthogonal axis type reducer having a hypoid gear may be connected to a lower end of the screw shaft, and the inverter motor may be connected to the reducer.

According to this configuration, since the orthogonal axis type reducer is attached to the lower end of the screw shaft arranged in the vertical direction, it is possible to reduce length of the entire center mechanism. A quiet property and gear efficiency can be improved with using the hypoid gear, and there is no occurrence of a self-locking state in which a motor shaft cannot be rotated from the side of the screw shaft. Therefore, it is also possible to prevent downward impact force in the vertical direction imposed on the center mechanism from this point of view.

In the case where the mechanical brake is used, the mechanical brake may be directly connected to the motor.

According to this configuration, the motor is provided with the mechanical brake. Therefore, it is possible for the center mechanism of the vulcanizer to have a simpler structure.

In the above basic configuration of the center mechanism of the tire vulcanizer, the motor may be a servomotor.

According to this configuration, at the point when a fixed load or more is imposed on the servomotor, the servomotor is allowed to freely rotate. Thereby, the impact on the constituent parts of the center mechanism such as the screw shaft due to the contact between the upper die and the upper ring body is eased. As a result, it is possible to prevent the damage and the breakage of the constituent parts of the center mechanism provided in the tire vulcanizer.

Further, in the case where the servomotor is used, the motor control means may have a servo-locking function for controlling the servomotor so as to retain a predetermined position of the upper ring body, and control the position of the upper ring body through the motor so that the bladder retains a shaping state in a state that the upper die is opened.

In the case where the servomotor is used, the motor control means may have a speed controlling function, and after the position control of the upper ring body is started, the motor control means may control the servomotor by the speed controlling function of the motor control means so that the upper ring body performs a lowering action at lower speed than closing action speed of the upper die while the upper die and the upper ring body are brought into contact with each other.

According to this configuration, the upper die and the upper ring body are brought into contact with each other while moving in the same direction. Therefore, in comparison to the case where the upper die is brought into contact with the stopped upper ring body, the contact can be achieved with low relative speed. Thereby, it is possible to suppress the impact force due to the contact between the upper die and the upper ring body. The servomotor is used here. Therefore, for example, in the case where the timing for setting the upper ring body to be free (rotation of the servomotor to be free) is too early, a rise of the upper ring body by shaping pressure is detected and the servomotor is properly controlled by the motor control means on the basis of a detected value thereof. Thereby, it is possible to easily retain the original position of the upper ring body. In the case where the timing for setting the upper ring body to be free is too late or the like, a rise of a motor current is detected and the servomotor is properly controlled by the motor control means so that the rotation of the servomotor is set to be free (power supply of the servomotor is cut off so as to allow free rotation) on the basis of a detected value thereof. Thereby, it is possible to easily set the upper ring body to be free.

In the case where the servomotor is used, the motor control means may have a torque limiting function for limiting an overload imposed on the servomotor when the servomotor receives generative force generated in accordance with a lowering action of the upper ring body due to a closing action of the upper die, and after the position control of the upper ring body is started, the closed upper die and the upper ring body controlled so as to be retained at a predetermined position may be brought into contact with each other in a state that the torque limiting function of the motor control means is activated.

According to this configuration, when the upper die and the upper ring body are brought into contact with each other in a state that the torque limiting function of the motor control means is activated, the servomotor is allowed to freely rotate at the point when a fixed load or more is imposed on the servomotor. Thereby, the impact on the constituent parts of the center mechanism such as the screw shaft due to the contact between the upper die and the upper ring body is eased. As a result, it is possible to prevent the damage and the breakage of the constituent parts of the center mechanism provided in the tire vulcanizer.

Further, in the case where the torque limiting function is provided, the motor control means may have a servo-locking function for controlling the servomotor so as to retain a predetermined position of the upper ring body, and the closed upper die and the upper ring body controlled to be retained at the predetermined position may be brought into contact with each other in a state that the servo-locking function is activated.

According to this configuration, when the upper die and the upper ring body are brought into contact with each other in a state that the servo-locking function and the torque limiting function of the motor control means are activated, an overload imposed on the constituent parts of the center mechanism such as the screw shaft can be more effectively prevented. Therefore, it is possible to more perfectly prevent the damage and the breakage of the constituent parts of the center mechanism provided in the tire vulcanizer.

In the case where the servomotor is used, the motor may be a reducer-installed servomotor, a parallel axis type reducer having two larger and smaller spur gears may be connected to a lower end of the screw shaft, the reducer-installed servomotor may be connected to the reducer, and the reducer-installed servomotor may be formed so as to be freely removed from the reducer together with the smaller spur gear.

According to this configuration, since the reducer having the spur gears is used, manufacture and maintenance of the reducer, maintenance of the motor and the like are easily performed and there is no occurrence of the self-locking state in which the motor shaft cannot be rotated from the side of the screw shaft. Therefore, it is also possible to prevent the downward impact force in the vertical direction imposed on the center mechanism from this point of view.

In the above basic configuration of the center mechanism of the tire vulcanizer, the screwing mechanism may be formed by a multiple threaded slide screw having a lead angle of 30 degrees or more.

According to this configuration, rotational resistance of the screw shaft due to acting force in the screw shaft direction is reduced. Therefore, the screw shaft is smoothly rotated by lowering force of the upper ring body on the basis of the closing action of the upper die. As a result, it is possible to prevent the damage of a screwing part of the screw shaft and the screw nut and also suppress the downward impact force in the vertical direction.

A basic control method for a center mechanism of a tire vulcanizer according to the present invention is the control method for the center mechanism of the tire vulcanizer for controlling a raising and lowering action of an upper ring body retaining an upper edge part of a bladder by a motor through a screwing mechanism provided with a screw shaft arranged in the vertical direction and a screw nut screwed onto the screw shaft, wherein position control of the upper ring body by the motor is started before an upper die and the upper ring body are brought into contact with each other and functions at the instance when the upper die and the upper ring body are brought into contact with each other.

In the above basic control method for the center mechanism of the tire vulcanizer, the control method may comprise the following steps: a shaping step for performing shaping in a state that a predetermined position of the upper ring body is retained by operating a mechanical brake; a control switching step for releasing the operation of the mechanical brake and starting the position control of the upper ring body by the motor within a time range from start of a closing action of the upper die of the tire vulcanizer after the shaping step to contact between the upper die and the upper ring body; and an upper ring body controlling step for controlling the position of the upper ring body by the motor after the control switching step. Here, control means of the motor may be an inverter provided with a DC braking function, the motor may be an inverter motor, and the upper ring body controlling step may be a step in which the inverter controls the inverter motor by the DC braking function of the inverter so that the position of the upper ring body is controlled so as not to move to the upper side.

In the above basic control method for the center mechanism of the tire vulcanizer, the motor may have a speed controlling function, the motor may be a servomotor, and in the position control of the upper ring body by the motor, the servomotor may be controlled by the speed controlling function of the motor so that the upper ring body performs a lowering action at lower speed than closing action speed of the upper die while the upper die and the upper ring body are brought into contact with each other.

In the above basic control method for the center mechanism of the tire vulcanizer, the motor may be a servomotor, the servomotor may receive generative force generated in accordance with contact of the upper die with the upper ring body as external force, and the servomotor may be freely rotated when reverse torque of the servomotor generated in the direction counteracting against the external force exceeds a predetermined value which is preliminarily set so as to limit an overload imposed on the motor.

In the above basic control method for the center mechanism of the tire vulcanizer, the motor may be a servomotor, and the control method may include a shaping position controlling step for performing shaping in a state that a predetermined position of the upper ring body is retained by controlling the servomotor so as to perform servo-locking. Here, the servomotor may further be controlled to be freely rotated when the reverse torque exceeds the predetermined value which is set to be smaller than a value of torque driven in the shaping position controlling step.

Effects obtained by the control method for the center mechanism of the tire vulcanizer are the same as effects obtained by the corresponding configurations of the above device.

DESCRIPTION OF THE PREFERRED EMBODIMENTS

Hereinafter, a description will be given to best modes for carrying out the present invention with reference to the drawings.

First Embodiment

Figure 1:
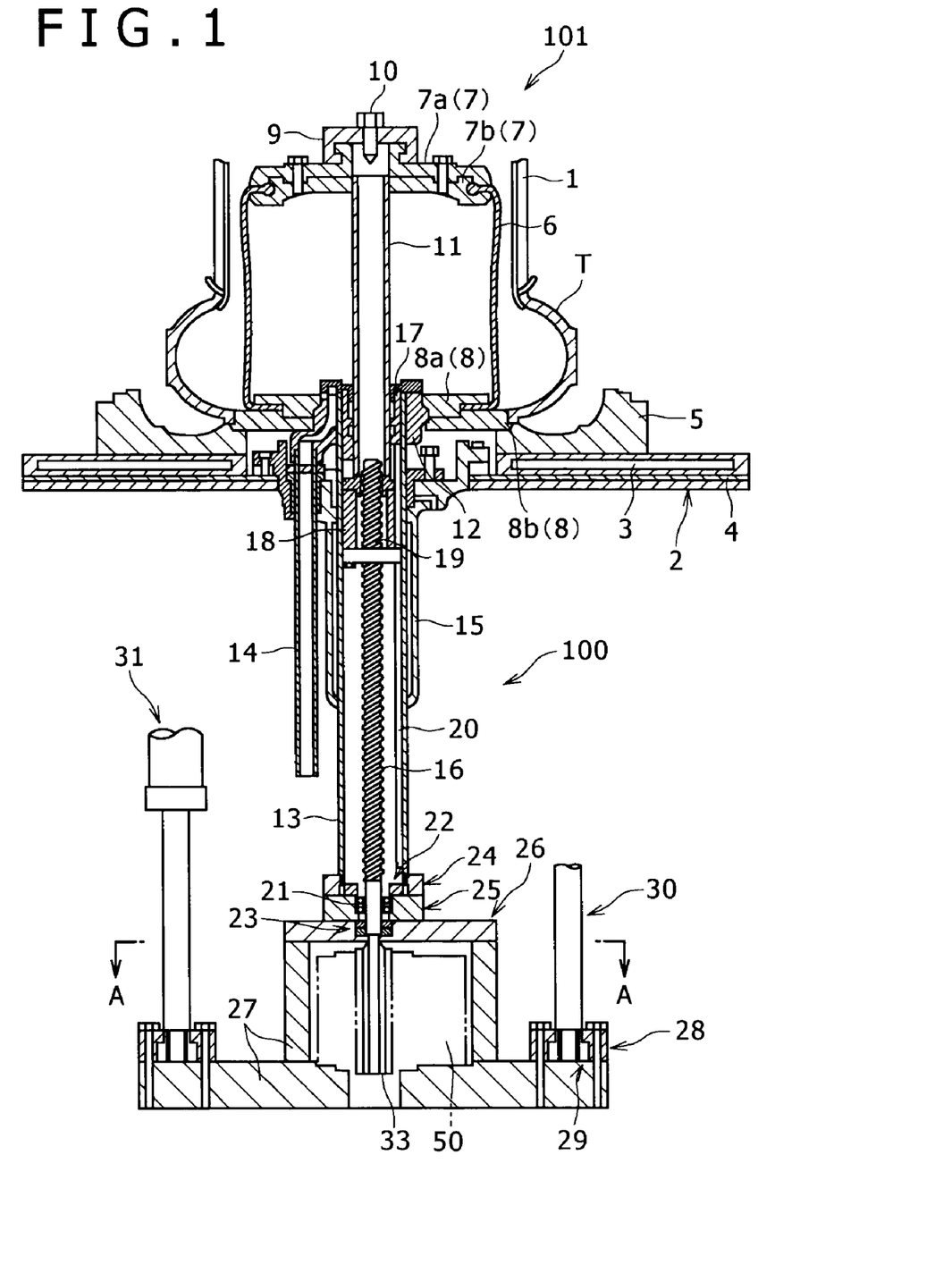
FIG. 1 is a schematic elevation sectional view showing a first embodiment of a center mechanism of a tire vulcanizer according to the present invention.
Figure 2:
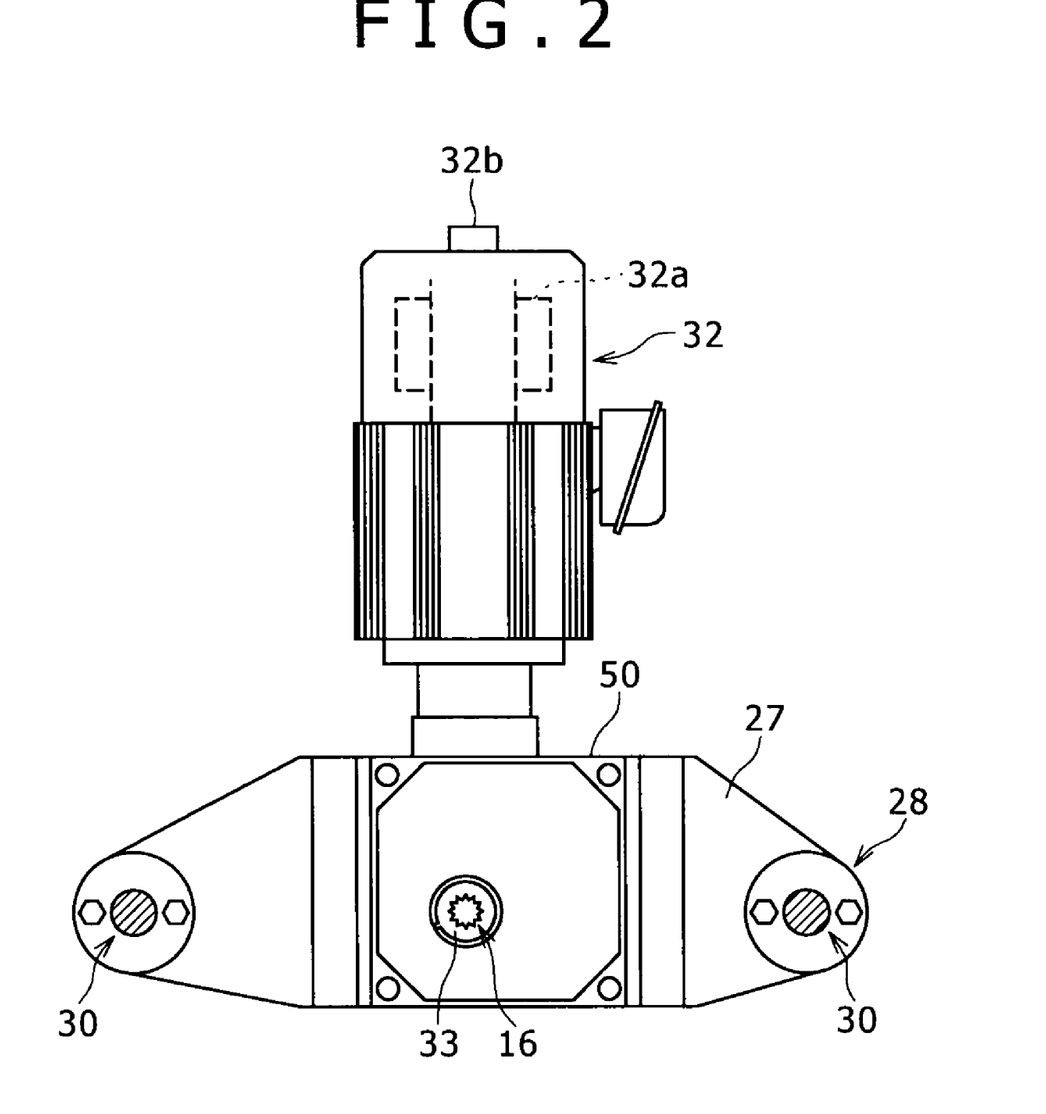
FIG. 2 is a sectional view by line A-A of FIG. 1.
Figure 3:
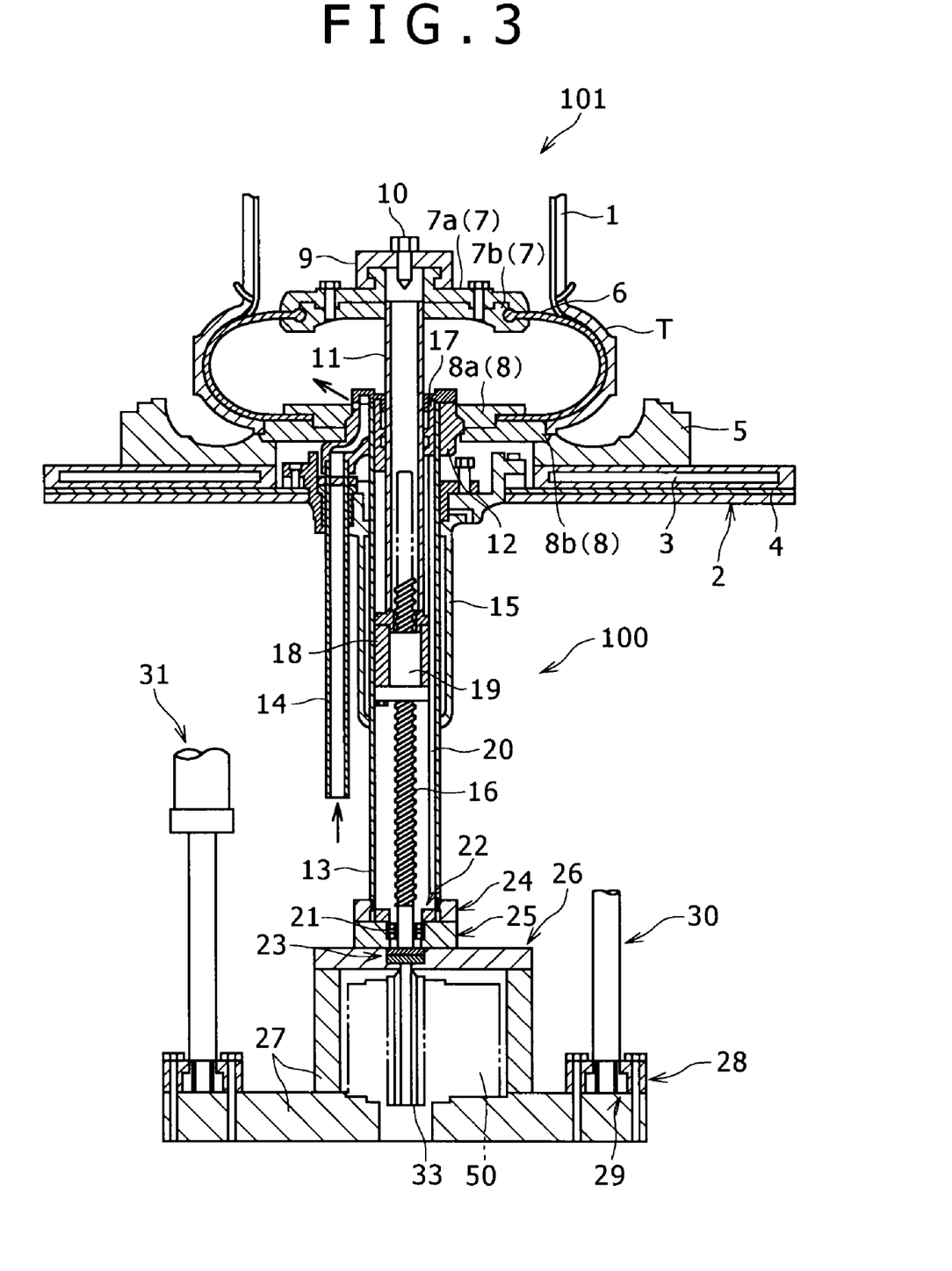
FIG. 3 is a schematic elevation sectional view showing the first embodiment of the center mechanism of the tire vulcanizer according to the present invention.
Figure 4:
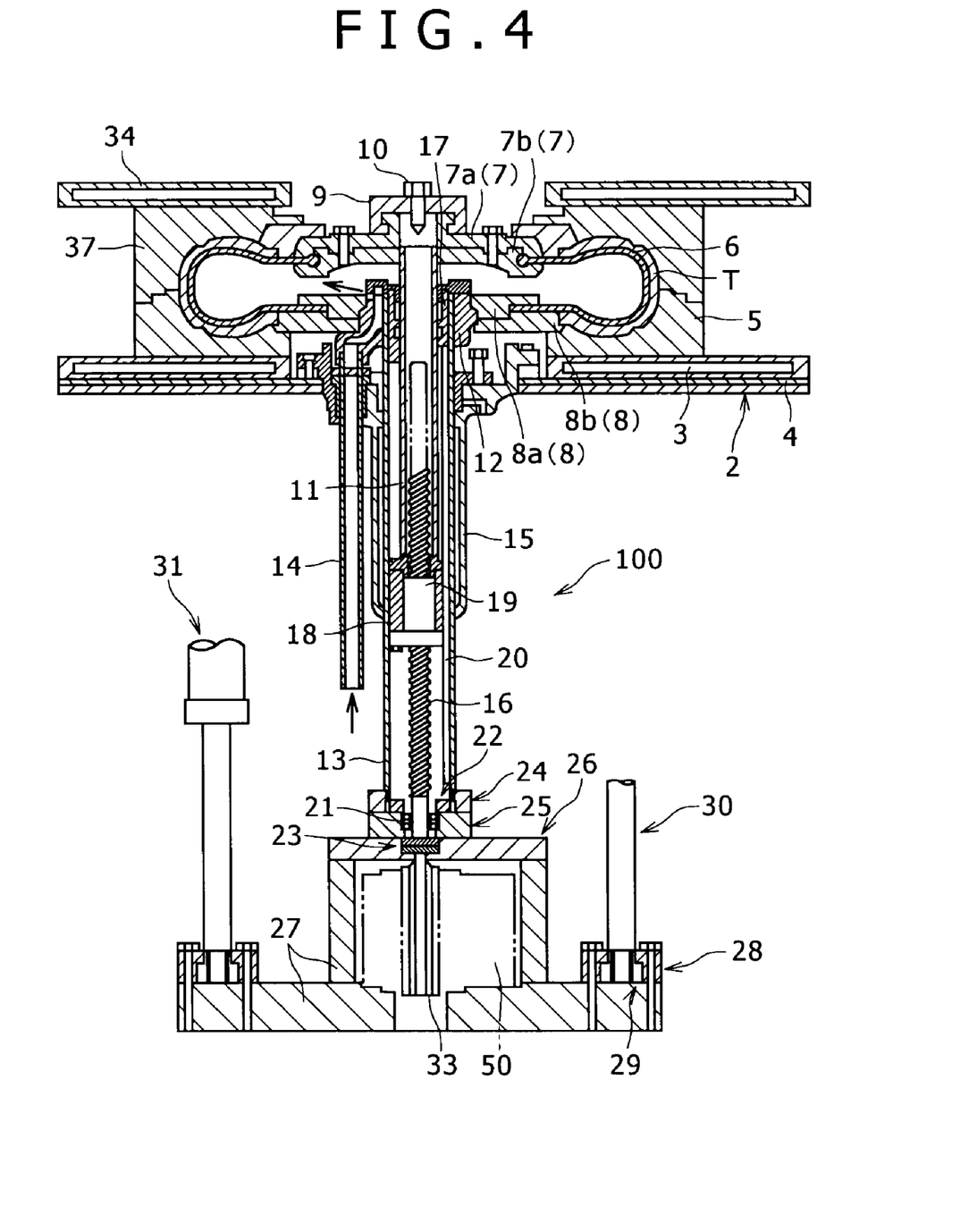
FIG. 4 is a schematic elevation sectional view showing the first embodiment of the center mechanism of the tire vulcanizer according to the present invention.

FIGS. 1, 3 and 4 are schematic elevation sectional views showing a first embodiment of a center mechanism of a tire vulcanizer according to the present invention. FIG. 2 is a sectional view by line A-A of FIG. 1.

As shown in FIGS. 1 to 4, a tire vulcanizer 101 is provided with an upper die 37 and a lower die 5 both for detachably housing a green tire T, a bladder 6 arranged on the inside of the green tire T, and a center mechanism 100 for attaching and detaching the bladder 6 by raising and lowering the bladder 6 in the vertical direction. The green tire T is sandwiched by the upper die 37 and the lower die 5 so as to be housed in the die (37, 5) and then vulcanization-molded by heating from the inside and the outside of the die. The center mechanism 100 of the tire vulcanizer is a mechanism for attaching and detaching the bladder 6 arranged in the center of the die (37, 5) to and from the inside of the green tire T. It should be noted that a heating and pressurizing medium for vulcanization-molding the green tire T includes steam, high temperature gas (such as inert gas including nitrogen gas and the air) or the like.

In a tire vulcanizer 101, the lower die 5 is attached to an upper surface of a lower platen 3. The lower platen 3 is attached to the upper surface side of a lower base 2 through an insulating material 4. An upper platen 34 is attached to an upper surface of the upper die 37 (refer to FIG. 4). The heating and pressurizing medium with a high temperature and high pressure such as steam is supplied to the upper platen 34 and the lower platen 3. The green tire T is heated by the heated upper platen 34 and the lower platen 3 through the die (37, 5) from an outer peripheral surface.

An upper edge part of the bladder 6 is retained by an upper ring body 7 (7a, 7b). Specifically, the entire periphery of the upper edge part of the bladder 6 is sandwiched and retained by the upper ring bodies 7a and 7b from the up and down direction. Then, a central part of the upper ring body 7 retaining the upper edge part of the bladder 6 is attached to an upper end of a hollow cylindrical piston rod 11 arranged in the center of the tire vulcanizer 101 by a cap 9 and a bolt 10. The entire periphery of a lower edge part of the bladder 6 is sandwiched and retained by lower ring bodies 8a and 8b from the up and down direction as well as the upper edge part. Then, the lower ring body 8 retaining the lower edge part of the bladder 6 is screwed into and fixed to a cylindrical hub 12 arranged in the center of the tire vulcanizer 101. A lower part of this hub 12 is coupled to an internal pipe 14 for supplying the heating and pressurizing medium into the bladder 6. It should be noted that an internal pipe (not shown) for discharging the heating and pressurizing medium supplied into the bladder 6 from the inside of the bladder 6 is also coupled to the lower part of the hub 12. The green tire T is heated and pressurized by the heating and pressurizing medium supplied from the internal pipe 14 through the bladder 6 arranged inside thereof from the inside.

An upper end of a hollow cylindrical lift cylinder 13 is attached to the inside of the hub 12, and the piston rod 11 is moved up and down the inside thereof. A screw nut 19 to be screwed onto a screw shaft 16 is attached to an inner diameter part of a cylindrical rod head 18 arranged in a lower end of this piston rod 11 and a key groove is provided in an outer diameter part of the cylindrical rod head 18 and fitted into a key 20 which is an inner surface of the lift cylinder 13 and provided over the substantially entire length in the longitudinal direction. The screw nut 19 is a nut having a large diameter portion and a small diameter portion having longer length than length of this large diameter portion in the up and down direction. A key groove is provided in an outer diameter part of the large diameter portion and fitted into the key 20 as well as the rod head 18.

A screwing mechanism which is provided with the screw shaft 16 arranged in the vertical direction and the screw nut 19 screwed onto the screw shaft 16 is housed in the lift cylinder 13. A cylindrical rod guide 17 having a seal (not shown) is attached to an upper part of the lift cylinder 13. The piston rod 11 is guided and moved up and down by this rod guide 17. When the screw shaft 16 is rotated, the screw nut 19 is not rotated but moved up and down by the key 20. The piston rod 11 supported by the screw nut 19 and the upper ring body 7 attached to the upper end of the piston rod 11 are raised and lowered by the up and down movement of the screw nut 19.

In the present embodiment, a screwing part of the screw shaft 16 and the screw nut 19 is trapezoidal screw thread which is one of a slide screws, has a lead angle of 30 degrees and is double threaded. It should be noted that a lower end of the screw shaft 16 is machined so as to form spline and coupled to a motor 32 connected to a reducer 50 having a hollow output shaft through a sleeve 33 having an inner periphery of the spline (and an outer periphery of the key). The reducer 50 is an orthogonal axis type reducer having a hypoid gear. The motor 32 is an inverter motor controlled by an inverter (motor control means) not shown provided with a DC braking function. The inverter is housed in an inverter board which is separately provided or the like. A mechanical brake 32a such as an electromagnetic clutch/brake is directly connected to the motor 32. Further, an absolute type encoder 32b is attached to a rear end of the motor 32. The encoder 32b is position detecting means for detecting a position of the upper ring body 7 retaining the upper edge part of the bladder 6. Since the encoder 32b is attached to the motor 32, there is no need for a position detecting device which is exclusive for the upper ring body 7. It should be noted that this position detecting means is not limited to the absolute type encoder 32b. Since the orthogonal axis type reducer 50 is attached to the lower end of the screw shaft 16, it is possible to reduce the length of the entire center mechanism 100. An orthogonal axis type reducer using a bevel gear may be used.

A bearing 21 is attached to the upper side in the vicinity of a spline part of the screw shaft 16. An outer ring of the bearing 21 is fitted to a bearing plate 25 and the bearing 21 is fixed to the bearing plate 25 by a bearing holder 22. The bearing plate 25 is sandwiched between and fixed to a coupling plate 24 having a two-divided structure fitted to an outer periphery of the lift cylinder 13, and a nut 23 (a double nut) screwed onto the screw shaft 16.

The reducer 50 connected to the motor 32 is attached to a bracket 27 in a plate shape. The bracket 27 is connected to a rod 30 of a cylinder 31 arranged in parallel to the lift cylinder 13 through a rod holding member 28 and a T head member 29. The cylinder 31 is fixed to the lower base 2 (a fixing mode is not shown). It should be noted that the cylinder 31 is a device for moving up and down (raising and lowering) the entire center mechanism 100 at a part of the lift cylinder 13 along a cylinder guide 15. For example, a second cylinder described in Japanese Patent No. 3221816 corresponds to this cylinder 31. An upper part of the bracket 27 is connected to the bearing plate 25 through a lid plate 26.

Next, a description will be given to an action of the center mechanism 100 of the tire vulcanizer according to the present embodiment. FIG. 1 is a view showing a state that the green tire T is brought into the tire vulcanizer 101 with the bladder 6 raised on standby. FIG. 3 is a view showing a shaping state. FIG. 4 is a view showing a vulcanizing state.

Firstly, as shown in FIG. 1, the motor 32 is rotated in a state that the upper die 37 of the tire vulcanizer 101 is opened, and the upper ring body 7 retaining the upper edge part of the bladder 6 is raised so as to hold the tire vulcanizer 101 on standby. Then, the green tire T is brought into the center of the lower die 5 by a loader 1. In this state, the motor 32 is rotated in the reverse direction and the upper ring body 7 is lowered so that the position of the upper ring body 7 (a position of the upper edge part of the bladder 6) is at a shaping position shown in FIG. 3. The position of the upper ring body 7 is detected by the encoder 32b. When the position of the upper ring body 7 is at the shaping position, the mechanical brake 32a is operated so that the brake is put on.

Then, a pressurizing medium (steam, $N_2$ gas or the like) with lower pressure than the internal pipe 14 is supplied to the bladder 6 so as to start the shaping (a shaping step). When the pressurizing medium with low pressure is supplied to the bladder 6, raising force is imposed on the upper ring body 7 by the pressure. However, since the mechanical brake 32a is operated, the position of the upper ring body 7 is retained at the shaping position.

Then, a retaining part of the loader 1 for conveying the green tire is contracted and closed so as to retreat the loader 1 from the tire vulcanizer 101. When the loader 1 is retreated, the upper die 37 performs the closing action so that die clamping is performed on the green tire T with the upper die 37 and the lower die 5 (refer to FIG. 4). When the upper die 37 is closing, the upper die 37 and the upper ring body 7 are firstly brought into contact with each other and then the upper ring body 7 is lowered (pushed down) by a lowering action of the upper die 37. Here, at the same time as start of the closing action of the upper die 37, an operation of the mechanical brake 32a is released (the mechanical brake 32a is disengaged) and the control is switched so as to start the position control of the upper ring body 7 by the inverter (the motor control means) (a control switching step). Specifically, at the same time as the start of the closing action of the upper die 37, the brake is put on the motor 32 by the DC braking function provided in the inverter, and the operation of the mechanical brake 32a is released (the mechanical brake 32a is disengaged) (there is a period of time when both the brake by the DC braking function provided in the inverter and the brake by the mechanical brake 32a are overlappingly put on. It should be noted that this period of time of overlapping brake can be short). Then, the brake by the DC braking function is continuously put on, and this brake is released immediately before the upper die 37 and the upper ring body 7 are brought into contact with each other (an upper ring body controlling step). The brake by the DC braking function is continuously put on until immediately before the contact between the upper die 37 and the upper ring body 7. Therefore, until immediately before the contact, the position of the upper ring body 7 is retained at the shaping position shown in FIG. 3 and the upper ring body 7 is not raised by the shaping pressure. When the brake by the DC braking function is released and the upper die 37 and the upper ring body 7 are brought into contact with each other, the upper ring body 7 is pushed down by the upper die 37. At this time, the screw shaft 16 is reversed by lowering force of the upper ring body 7.

During the closing action of the upper die 37, in order to suppress impact force generated at the time of the contact between the upper die 37 and the upper ring body 7 and suppress a rise of the upper ring body 7 by the shaping pressure, the brake has to be released immediately before (at the very last moment before) the contact between the upper die 37 and the upper ring body 7. However, there is a problem that setting of the release timing is difficult. Here, brake force (torque) by the DC braking function provided in the inverter is smaller and more stabilized (with less accidental error) than brake force (torque) of the mechanical brake 32a. Therefore, in the case of the control by the inverter, even when the upper ring body 7 and the upper die 37 are collided with each other in a state that the brake by the DC braking function is put on due to an accidental error of the position detecting means (not shown) provided in the vulcanizer itself, incorrect setting of a brake release position or the like, the motor 32 is allowed to rotate with a fixed load or more imposed on the motor 32. As a result, a fixed overload or more is not imposed on constituent parts of the center mechanism 100 such as the screw shaft 16 and the reducer 50. Although an over-current flows in the motor 32, the mechanical brake 32a which is not operated is never broken. Therefore, it is possible to prevent damage and breakage of the constituent parts of the center mechanism 100 provided in the tire vulcanizer 101. Since generation of a fixed overload or more can be prevented as described above, there is no need for providing a fluid impact absorbing device as described in Japanese Patent Laid-Open No. Sho 62-6964. Therefore, it is possible for the center mechanism 100 of the vulcanizer to have a simple structure.

Since the screwing mechanism is formed by a double threaded trapezoidal screw thread having a lead angle of 30 degrees, the screw shaft 16 is easily reversed. That is, when the lead angle is as large as 30 degrees or more, rotational resistance of the screw shaft 16 due to acting force in the screw shaft direction is small. Therefore, the screw shaft 16 is smoothly reversed by the lowering force of the upper ring body 7 on the basis of the closing action of the upper die 37 (reliability at the time of reversing a screwing part is improved) and it is possible to prevent the damage of the screwing part of the screw shaft 16 and the screw nut 19 and further suppress downward impact force in the vertical direction imposed on the center mechanism 100 due to the contact between the upper die 37 and the upper ring body 7. It should be noted that a ball screw is used in Japanese Patent Laid-Open No. Sho 62-6964. The ball screw is capable of converting linear movement into rotational movement highly efficiently even with a small lead angle. Therefore, the ball screw may also be used in the present embodiment as the screwing mechanism formed by the screw shaft and the screw nut. However, since the ball screw has a structure in which the screw shaft and the screw nut are precisely meshed with each other through the ball, there is weakness against a foreign substance such as waste. Therefore, in the case where the waste or the like is meshed so that efficiency is lowered, there is a possibility that the screw shaft 16 cannot be reversed relative to closing force of the upper die 37 so as to be broken. Although there is a ball screw with a high dust-proof property by providing a seal in a special shape, the ball screw is expensive. Therefore, a multiple threaded trapezoidal screw thread having a large lead angle is preferably used as in the present embodiment.

In the present embodiment, the hypoid gear is used as a gear of the reducer 50. Therefore, a quiet property and gear efficiency can be improved and there is no occurrence of a self-locking state as generated in a worm reducer. Consequently, it is possible to prevent the downward impact force in the vertical direction imposed on the center mechanism 100 from this point of view.

When the closing action of the upper die 37 is progressed, the upper die 37 and the lower die 5 are eventually brought into contact with each other, and fastening force is generated between the upper and lower dies (37 and 5). In this state, the heating and pressurizing medium with a high temperature and high pressure is supplied from the internal pipe 14 into the bladder 6 so as to start vulcanization. When the green tire T is heated for a predetermined time, rubber thereof is vulcanized. After the vulcanization is finished, the upper die 37 performs an opening action so that the upper die 37 is retreated to the upper side. Then, the bracket 27 is raised by the cylinder 31. By this action, the vulcanized tire and the entire bladder 6 are raised so that the tire is removed from the lower die 5. Further, since the motor 32 is rotated so as to raise the upper ring body 7, the bladder 6 is drawn from the vulcanized tire. Then, this tire is taken from the tire vulcanizer 101 by an unloader (not shown) for the vulcanized tire. Since the inverter is used, it is possible to set speed for lowering the upper ring body 7 to the shaping position to be low speed while speed for raising the upper ring body 7 after the vulcanization to be high speed.

Second Embodiment

Figure 5:
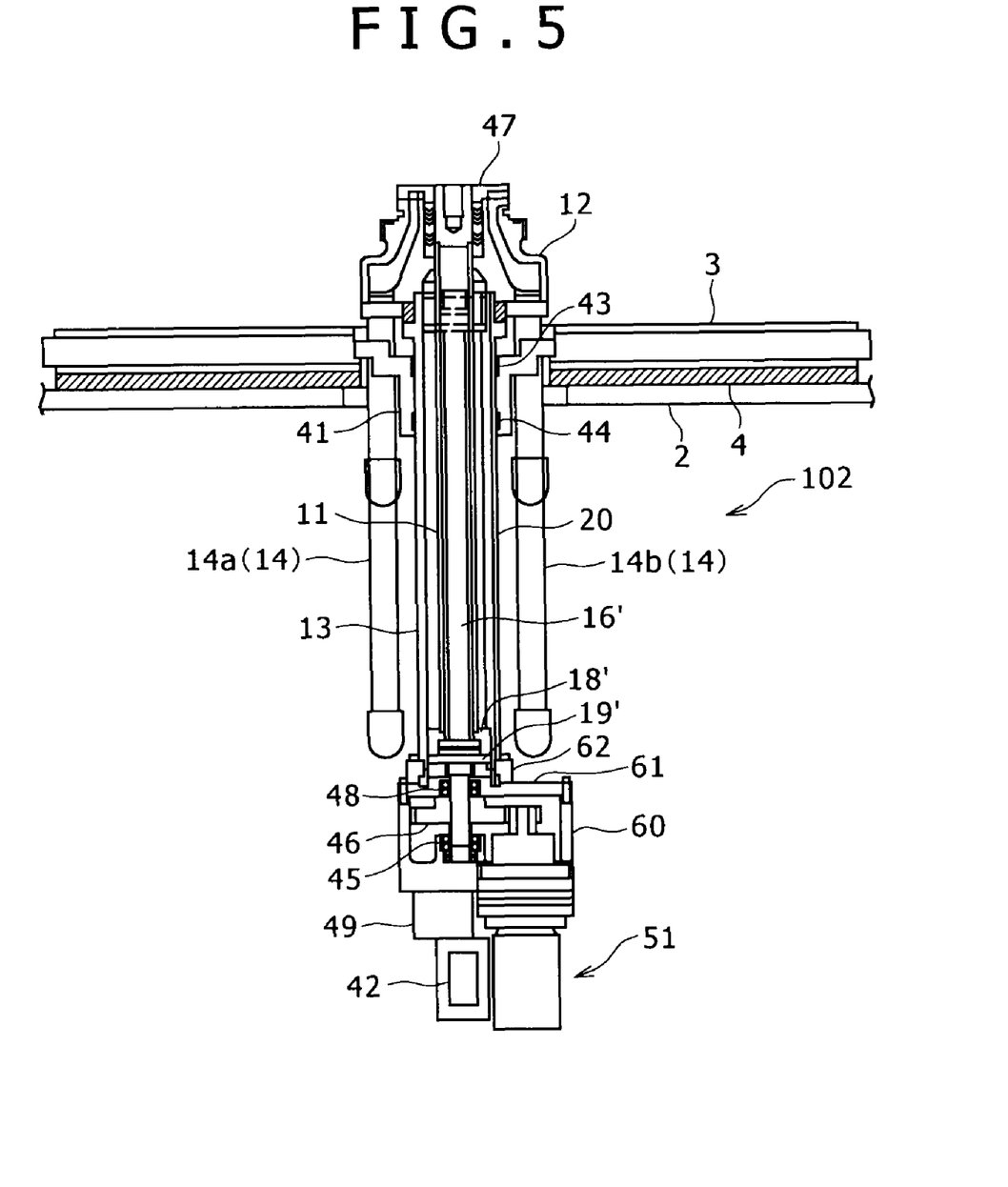
FIG. 5 is a schematic elevation sectional view showing a second embodiment of the center mechanism of the tire vulcanizer according to the present invention.

FIG. 5 is a schematic elevation sectional view showing a second embodiment of the center mechanism of the tire vulcanizer according to the present invention. It should be noted that the figure is a view showing a different constituent members from the center mechanism 100 of the first embodiment and peripheral members thereof with regard to the second embodiment of the center mechanism of the tire vulcanizer. In the figure, for example, the upper and lower dies (37 and 5), the upper ring body 7, the lower ring body 8, the bladder 6 and the like shown in the first embodiment are properly omitted. The same constituent members as the constituent members of the center mechanism 100 of the first embodiment are given the same reference numerals. It should be noted that FIG. 5 is a view of a center mechanism 102 in a state that the die clamping is performed on the tire with the upper die 37 and the lower die 5, that is, in a state that a screw nut 19' is lowered as much as possible.

As shown in FIG. 5, as well as the first embodiment, the lower platen 3 is attached to the upper surface side of the lower base 2 through the insulating material 4. In the present embodiment, a cylindrical guide 41 is arranged in the center of the vulcanizer and fixed to the lower platen 3. The entire center mechanism 102 of the present embodiment is raised and lowered by a known drive mechanism 42 of a knock-out lever type attached to a lower end of the center mechanism 102 along the cylindrical guide 41 for guiding the lift cylinder 13, and thereby the vulcanized tire is removed from the lower die (not shown).

The upper ring body (not shown) retaining the upper edge part of the bladder is attached to the upper edge part of the hollow cylindrical piston rod 11 as well as the first embodiment. The lower ring body (not shown) retaining the lower edge part of the bladder is also attached to the cylindrical hub 12 arranged in the center of the vulcanizer as well as the first embodiment. A cylindrical rod head 18' to which the screw nut 19' is fixed is provided in a lower end of the piston rod 11. A key groove is provided in outer diameter parts of the rod head 18' and the screw nut 19' and fitted to the key 20 which is the inner surface of the hollow cylindrical lift cylinder 13 arranged in the center of the vulcanizer and provided over the substantially entire length in the longitudinal direction.

A screwing mechanism provided with a screw shaft 16' and the screw nut 19' screwed onto the screw shaft 16' is housed in the lift cylinder 13. When the screw shaft 16' is rotated, rotation of the screw nut 19' is prevented by the key 20. Therefore, the screw nut 19' is moved up and down and thereby the piston rod 11 is moved up and down inside the lift cylinder 13. In the present embodiment, a screwing part of the screw shaft 16' and the screw nut 19' is a double threaded trapezoidal screw thread having a lead angle of 45 degrees.

A lower part of the screw shaft 16' is supported by two bearings 45 and 48 in order to support radial force and thrust force in accordance with rotation thereof. A parallel axis type reducer 46 having two larger and smaller spur gears is arranged between the two bearings 45 and 48. The smaller spur gear of this reducer 46 is directly connected to an output shaft of the servomotor so as to be detached together with a reducer-installed servomotor 51 and directly driven by the reducer-installed servomotor 51. The reducer-installed servomotor 51 is controlled by the motor control means (not shown) having a speed controlling function. The reducer-installed servomotor 51 is directly connected to the mechanical brake and provided with the absolute type encoder (not shown). In order to make a diameter as small as possible, a high speed servomotor of a flat type having short length in the motor shaft direction and a small-sized reducer are adopted as the reducer-installed servomotor 51. It should be noted that although the reducer-installed servomotor 51 provided with the reducer is used in the present embodiment, there is not always a need for providing the reducer in the servomotor. Instead, the reducer may be provided separately.

The lower bearing 45 and the reducer-installed servomotor 51 are housed in a gear case 60 in a box shape. An upper part of the gear case 60 is closed by a lid plate 61 provided with a hole into which the screw shaft 16' is to be inserted. The upper bearing 48 is attached to the hole of the lid plate 61. The lid plate 61 and the lift cylinder 13 are fixed by a two-divided bracket 62. Heat resistance grease is charged into the gear case 60 and a lower part in the lift cylinder 13 so as to lubricate a rotation part at the time of raising and lowering (moving up and down) the piston rod 11. A raising and lowering action of the lift cylinder 13 is guided by two bushings 43 and 44 having a self-lubricating property fitted to an inner surface of the cylindrical guide 41. A cylindrical guide 47 provided with a seal for guiding the piston rod 11 is provided in a center part of the hub 12 in an upper end of the lift cylinder 13. The internal pipe 14 (14a, 14b) for supplying or discharging the heating and pressurizing medium to or from the inside of the bladder is connected to a lower part of an outer periphery of the hub 12.

The gear case 60 is attached to the drive mechanism 42 through a bracket 49. The bracket 49 performs level adjustment between the center mechanism 102 and the conventional drive mechanism 42 and couples the center mechanism 102 and the drive mechanism 42 to each other. Since the small-sized reducer-installed servomotor 51 having a small diameter is used, the center mechanism 102 of the tire vulcanizer of the present embodiment is excellent in an arrangement property, and can be attached instead of the conventional center mechanism of fluid pressure driving described in U.S. Pat. No. 5,776,507 for example.

Next, a description will be given to an action of the center mechanism 102 of the tire vulcanizer according to the present embodiment. It should be noted that a description of the same action as the center mechanism 100 of the first embodiment will be properly omitted.

Firstly, values of the lowering speed, the shaping position, slower lowering speed, the raising speed and a raising position of the upper ring body are set in the motor control means of the reducer-installed servomotor 51 in advance. A contact position between the upper die and the upper ring body at the time of the closing action of the upper die (a closing time contact position) is set in the position detecting means provided in the vulcanizer itself.

Next, the reducer-installed servomotor 51 is rotated in a state that the upper die is opened, and the upper ring body is raised at predetermined raising speed which is preliminarily set so as to hold the tire vulcanizer on standby. The position of the upper ring body is detected by the encoder. Then, the green tire T is brought into the center of the lower die by the loader for conveying the green tire. The reducer-installed servomotor 51 is rotated in the reverse direction and the upper ring body is lowered at predetermined lowering speed which is preliminarily set so that the upper ring body is stopped at the shaping position. Then, the mechanical brake of the reducer-installed servomotor 51 is operated so that the brake is put on.

The pressurizing medium (steam, $N_2$ gas or the like) with lower pressure than the internal pipe 14a is supplied to the bladder so as to start the shaping (the shaping step). Then, the retaining part of the loader is contracted and closed so as to retreat the loader from the tire vulcanizer. When the loader is retreated, the upper die performs the closing action next. When the upper die starts performing the closing action, the operation of the mechanical brake is released and the control is switched so as to start the position control of the upper ring body by the motor control means for controlling the reducer-installed servomotor 51 (the control switching step). Specifically, at the same time as the start of the closing action of the upper die, the control for lowering the upper ring body at lower speed (slower lowering speed) than closing action speed of the upper die is started by the motor control means and the operation of the mechanical brake is released. Then, the upper ring body is lowered at the slower lowering speed. When the position detecting means provided in the vulcanizer detects a signal of the closing time contact position (although there is an accidental error, the upper die and the upper ring body are brought into contact with each other in the vicinity of this closing time contact position), the power supply of the reducer-installed servomotor 51 is cut off and rotation of the reducer-installed servomotor 51 is set to be free (the upper ring body controlling step). It should be noted that without using the signal of the closing time contact position of the upper die, the upper ring body is lowered at slower speed while over-current of the reducer-installed servomotor 51 due to the contact between the upper die and the upper ring body is detected, and then the power supply of the reducer-installed servomotor 51 may be cut off.

Since the motor control means controls the reducer-installed servomotor 51, the upper ring body is lowered at the slower speed. Therefore, during the closing action of the upper die, the upper ring body is not raised by the shaping pressure. After the contact between the upper die and the upper ring body, the upper ring body is pushed down by the upper die until the die clamping is finished. At this time, the screw shaft 16' is rotated by the lowering force of the upper ring body in accordance with the closing action of the upper die.

It should be noted that until the upper die performing the closing action is brought into contact with the fixed lower die, in order to set rotation of the servomotor to be free, there is a need for setting the slower lowering speed of the upper ring body so as to bring the upper die and the upper ring body into contact with each other. Provided that a stop position of the upper ring body at the time of the vulcanization is set, the upper ring body is stopped at the position, and the upper die is separately stopped by the contact with the lower die, there is sometimes a case where a slight gap is generated between the upper die and the upper ring body. When the slight gap is generated, the bladder is moved together with the upper ring body at the time of the vulcanization by the heating and pressurizing medium with a high temperature and high pressure. In order to prevent this, there is a need for setting the rotation of the servomotor to be free by setting the slower lowering speed of the upper ring body so as to bring the upper die and the upper ring body into contact with each other until the upper die performing the closing action is brought into contact with the fixed lower die.

According to the control switching step and the upper ring body controlling step of the present embodiment, the upper die and the upper ring body are brought into contact with each other while moving in the same direction. Therefore, in comparison to the case where the upper die is brought into contact with the stopped upper ring body, the contact can be achieved with low relative speed. Thereby, it is possible to suppress the impact due to the contact between the upper die and the upper ring body. The servomotor added with the encoder for controlling the position is used here. Therefore, for example, in the case where the timing for setting the upper ring body to be free (the rotation of the servomotor to be free) is too early, the rise of the upper ring body by the shaping pressure is detected and the position control by the servomotor (servo-locking) is started. Thereby, it is possible to easily retain the original position of the upper ring body. In the case where the timing for setting the upper ring body to be free is too late, the control is performed so as to detect the rise of the motor current and cut off the power supply of the servomotor (set the rotation of the servomotor to be free). Thereby, it is possible to easily set the upper ring body to be free.

In the control switching step and the upper ring body controlling step, the control may be performed so as to release the operation of the mechanical brake at the same time as the start of the closing action of the upper die, put the brake on the reducer-installed servomotor 51 by the speed controlling function provided in the motor control means for controlling the reducer-installed servomotor 51 (control at speed 0), and then release this brake (set the rotation of the servomotor to be free) when the upper die reaches the closing time contact position. The brake force (the torque) by a position controlling function provided in the motor control means is smaller and more stabilized (with less accidental error) than the brake force (the torque) of the mechanical brake. Therefore, in the case of the control by this motor control means, even when the upper die and the upper ring body are collided with each other in a state the brake by the position controlling function is put on, the servomotor is allowed to rotate with a fixed load or more imposed on the reducer-installed servomotor 51. As a result, a fixed overload or more is not imposed on constituent parts of the center mechanism 102 such as the screw shaft 16' and the reducer 46. Although the over-current flows in the servomotor, the mechanical brake which is not operated is never broken. Therefore, it is possible to prevent the damage and the breakage of the constituent parts of the center mechanism 102. Since the generation of a fixed overload or more can be prevented as described above, there is no need for providing the fluid impact absorbing device described in Japanese Patent Laid-Open No. Sho 62-6964.

When the closing action of the upper die is progressed, the upper die and the lower die are eventually brought into contact with each other, and the fastening force is generated between the upper and lower dies. In this state, the heating and pressurizing medium with a high temperature and high pressure is supplied into the bladder so as to vulcanization-mold the green tire T. After the vulcanization is finished, the upper die is retreated and then the center mechanism 102 is raised by the drive mechanism 42 so that the vulcanized tire is removed from the lower die. Then, the upper ring body is raised at predetermined speed which is preliminarily set and stopped at the raising position and the tire is taken from the tire vulcanizer.

Third Embodiment

Next, a description will be given to a third embodiment of a center mechanism of a tire vulcanizer according to the present invention. It should be noted that different points between the third embodiment and the second embodiment will be focused in the following description. A description of the same configuration and the same control (action) as the center mechanism according to the second embodiment will be properly omitted.

The different points between the center mechanism of the third embodiment and the center mechanism of the second embodiment firstly include the point that the mechanical brake is directly connected to the reducer-installed servomotor 51 of the center mechanism in the second embodiment while the mechanical brake is not attached to the reducer-installed servomotor 51 of the center mechanism in the third embodiment. There is no need for the mechanical brake in the center mechanism of the third embodiment. It should be noted that in the third embodiment as well as the second embodiment, there is not always a need for providing the reducer to (or installing the reducer in) the servomotor. Instead, the reducer may be provided separately.

The motor control means of the reducer-installed servomotor 51 in the third embodiment has the speed controlling function, a servo-locking function and a torque limiting function. The servo-locking function is a control function of positioning an object to be controlled (a position fixing controlling function), that is, a function for controlling the servomotor so as to retain a predetermined position of the upper ring body in the present embodiment. The torque limiting function is a function for limiting the torque generated by the servomotor, that is, a function for, when set torque or more is to be imposed on the servomotor, allowing rotation thereof so as not to impose a load of the set torque or more on the servomotor. The torque limiting function in the present embodiment is a function for limiting an overload imposed on the reducer-installed servomotor 51 when the reducer-installed servomotor 51 receives generative force generated in accordance with the lowering action of the upper ring body due to the closing action of the upper die as external force (reactive force). It should be noted that this torque limiting function can separately set the torque for each rotational direction (the forward direction and the backward direction) of the servomotor. In the present embodiment, the set torque by the torque limiting function for the torque (reverse torque) of the reducer-installed servomotor 51 generated in the direction counteracting against the external force at the time of receiving the external force is set to be smaller than the torque of the reducer-installed servomotor 51 generated in the direction counteracting against the shaping pressure (or the set torque by the torque limiting function for the above torque) at the time of raising the upper ring body by the shaping pressure.

It should be noted that since the set torque by the torque limiting function at the time of rotating the reducer-installed servomotor 51 in the direction of raising the upper ring body is set to be smaller than the torque at the time of rotating the reducer-installed servomotor 51 in the direction of lowering the upper ring body against the shaping pressure (or the set torque by the torque limiting function for the above torque), the impact on the constituent parts of the center mechanism such as the screw shaft due to the contact between the upper die and the upper ring body can be further eased. However, these two set torque may be the same value.

Next, a description will be given to control (an action) of the center mechanism of the tire vulcanizer according to the present embodiment with focusing on the different points from the second embodiment.

In the present embodiment, the reducer-installed servomotor 51 is rotated, the upper ring body is lowered at predetermined lowering speed which is preliminarily set and stopped at the shaping position, the servo-locking function is activated (operated), and the reducer-installed servomotor 51 is controlled so as to retain the upper ring body at the shaping position. Here, an action of activating the servo-locking function and retaining an object to be controlled (the upper ring body) at a predetermined position (the shaping position) is called as servo-locking. Then, in a state that the servo-locking function is activated and the upper ring body is retained at the shaping position, the shaping is performed (a shaping position controlling step).

Here, upward force by the shaping pressure is imposed on the upper ring body. Therefore, in the shaping position controlling step, the upper ring body is stopped against this upward force. That is, the torque in the direction of raising the upper ring body is imposed on the screw shaft of the screwing mechanism by this upward force. The reducer-installed servomotor 51 stops the rotation of the screw shaft against this torque. In the shaping position controlling step, the force of raising the upper ring body by the reducer-installed servomotor can be significantly smaller than the lowering force (in general, approximately 20% of the lowering force). Therefore, even when the set torque by the torque limiting function in the direction of rotating of the reducer-installed servomotor 51 in the direction of lowering the upper ring body is set to be smaller than the set torque by the torque limiting function in the direction of rotating of the reducer-installed servomotor 51 in the direction of raising the upper ring body, there is no influence over the shaping position controlling step.

Then, after the shaping position controlling step (the shaping step), the upper die performs the closing action (a die lowering step). It should be noted that here, as well as the second embodiment, at the same time as the start of the closing action of the upper die, the upper ring body may perform the lowering action at lower speed (slower lowering speed) than the closing action speed of the upper die by speed controlling function. Then, when the lowered upper die and the lowered upper ring body are brought into contact with each other, the reducer-installed servomotor 51 receives the generative force generated in accordance with the contact between the upper die and the upper ring body as the external force. When the torque (the reverse torque) for driving the reducer-installed servomotor 51 generated in the direction counteracting against the external force exceeds a predetermined value which is preliminarily set, the reducer-installed servomotor 51 is freely rotated so as to limit an overload imposed on the reducer-installed servomotor 51 (a torque limiting step).

As mentioned above, when the upper die and the upper ring body controlled to be retained at the shaping position are brought into contact with each other in a state that the speed controlling function for lowering the upper ring body at the slower speed or the servo-locking function and the torque limiting function of the motor control means are activated, the reducer-installed servomotor 51 is allowed to freely rotate at the point when a fixed load or more which is preliminarily set is imposed on the reducer-installed servomotor 51. Thereby, the screw shaft is also allowed to rotate and the impact on the constituent parts of the center mechanism such as the screw shaft due to the contact between the upper die and the upper ring body is eased. As a result, it is possible to prevent the damage and the breakage of the constituent parts of the center mechanism provided in the tire vulcanizer. Since the impact on the constituent parts of the center mechanism such as the screw shaft can be eased as described above, there is no need for providing the fluid impact absorbing device described in Japanese Patent Laid-Open No. Sho 62-6964. Therefore, it is possible for the center mechanism of the vulcanizer to have a simple structure.

It should be noted that in the present embodiment, the set torque by the torque limiting function in the case where the reducer-installed servomotor 51 is rotated in the direction of raising the upper ring body is desirably set to be smaller than the set torque by the torque limiting function in the case where the reducer-installed servomotor 51 is rotated in the direction of lowering the upper ring body. In comparison to the case where these two set torque are the same value, it is possible to further ease the impact on the constituent parts of the center mechanism such as the screw shaft due to the contact between the upper die and the upper ring body.

In the case where the upper ring body is lowered in a state that the upper die is opened, the upper ring body is lowered against the upward force of pushing up the upper ring body due to internal pressure in the bladder (the shaping pressure). Therefore, there is a need for relatively large torque for the servomotor. Consequently, the set torque by the torque limiting function in the case where the reducer-installed servomotor 51 is rotated in the direction of lowering the upper ring body is preferably selectively set to be large as mentioned above so as to limit the torque.

It should be noted that a period of time for retaining the position in the servomotor is related to a capacity of the motor. When the torque required for stopping is 70% of rated torque or less, the position can be retained indefinitely. In the case where the mechanical brake is provided as in the second embodiment, this period of time is at most a required period of time at the time of the closing action of the upper die (approximately 10 to 20 seconds). Therefore, the capacity of the servomotor can be reduced. In the case where the mechanical brake is provided so as to cut off the power supply and in the case of electric power failure, by retaining the position of the upper ring body, it is possible to restart an operation from the state. Therefore, since the mechanical brake is further provided as in the second embodiment, there are also merits of reducing the capacity of the motor and restarting the operation from the state after recovery of the electric power at the time of the electric power failure. Use of the mechanical brake may be determined in consideration to cost or the like.

As mentioned above, the embodiments of the present invention are described. However, the present invention is not limited to the above embodiments but can be variously modified within a scope of claims. For example, the present invention can be modified as follows.

(1) An example that the lead angle of the screwing part of the screw shaft and the screw nut is 30 degrees or 45 degrees is shown in the above embodiments. However, this lead angle may be 30 to 50 degrees. The screw thread is not limited to the double threaded screw but a single threaded screw or multiple threaded screw of triple threaded screw or more may be used.

(2) In the first embodiment, at the same time as the start of the closing action of the upper die 37, the brake operation state of the mechanical brake 32a is switched to the position control of the upper ring body 7 by the inverter (the motor control means). However, within a time range from the start of the closing action of the upper die 37 to the contact between the upper die 37 and the upper ring body 7, the operation of the mechanical brake 32a may be released and at least after the release of the operation of the mechanical brake 32a the control may be switched so as to start the position control of the upper ring body 7 by the inverter (the motor control means).

(3) In the second embodiment, at the same time as the start of the closing action of the upper die, the control is switched so as to start the position control of the upper ring body by the motor control means for controlling the reducer-installed servomotor 51 from the operation state of the mechanical brake. However, within a time range from the start of the closing action of the upper die to the contact between the upper die and the upper ring body, the operation of the mechanical brake may be released and at least after the release of the operation of the mechanical brake the control may be switched so as to perform the position control of the upper ring body by the motor control means for controlling the reducer-installed servomotor 51.

(4) In the first embodiment, as well as the second embodiment, at the same time as the start of the closing action of the upper die 37, the upper ring body 7 may be lowered at lower speed (slower lowering speed) than the closing action speed of the upper die 37 by the inverter.

We claim:

1. A center mechanism of a tire vulcanizer having an upper die, a bladder, and an upper ring body for retaining an upper edge part of said bladder, comprising:
    a screw shaft mounting said upper ring body and arranged in the vertical direction;
    a screwing mechanism provided with a screw nut screwed onto said screw shaft;
    a mechanical brake arranged to brake the upper ring body;
    a motor for rotating said screw shaft so as to raise and lower said upper ring body; and
    motor control means having a braking function for controlling a position of said upper ring body through said motor.

2. The center mechanism of the tire vulcanizer according to claim 1, wherein said motor control means is an inverter providing a DC braking function.

3. The center mechanism of the tire vulcanizer according to claim 2, further comprising a reducer having an axis orthogonal to the motor, and further comprising a hypoid gear connected to a lower end of said screw shaft, wherein the motor is connected to the reducer.

4. The center mechanism of the tire vulcanizer according to claim 1, wherein
    said mechanical brake is directly connected to said motor.

5. The center mechanism of the tire vulcanizer according to claim 1, wherein
    said motor is a servomotor.

6. The center mechanism of the tire vulcanizer according to claim 5, wherein
    said braking function is a speed controlling function.

7. The center mechanism of the tire vulcanizer according to claim 5, wherein
    said motor is a reducer-installed servomotor,
    a parallel axis type reducer having two larger and smaller spur gears is connected to a lower end of said screw shaft,
    the reducer-installed servomotor is connected to the reducer, and
    the reducer-installed servomotor is formed so as to be freely removed from the reducer together with the smaller spur gear.

8. The center mechanism of the tire vulcanizer according to claim 1, wherein
    said screwing mechanism is formed by a multiple threaded slide screw shaft having a lead angle of 30 degrees or more.

* * * * *